Feb. 14, 1961   H. L. YEAGLEY   2,971,491
SIGNAL WHISTLE
Filed Oct. 9, 1952
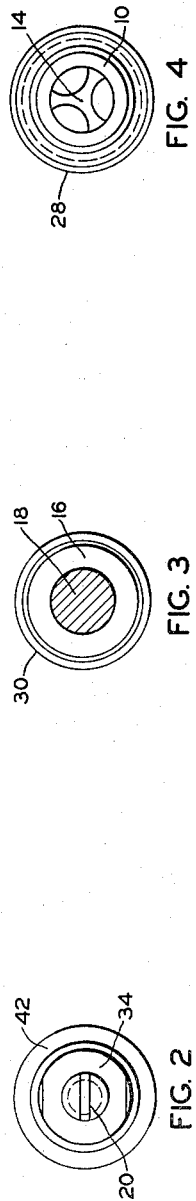
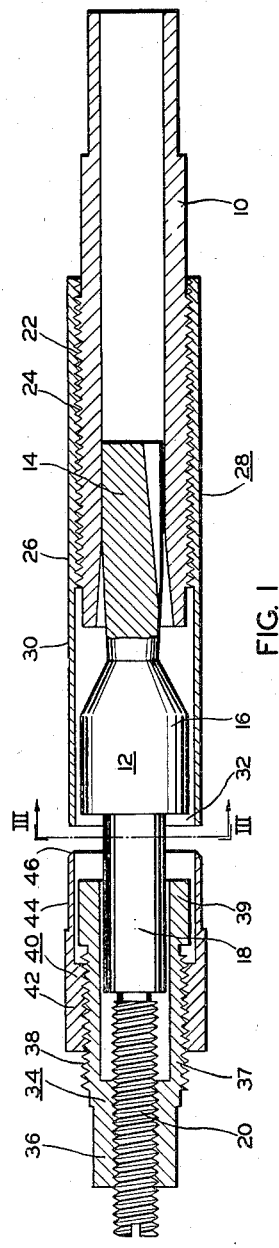
INVENTOR.
BY George Sipkin
Attorney

United States Patent Office 2,971,491
Patented Feb. 14, 1961

2,971,491

SIGNAL WHISTLE

Henry L. Yeagley, State College, Pa., assignor, by mesne assignments, to the United States of America as represented by the Secretary of the Navy Filed Oct. 9, 1952, Ser. No. 313,845

3 Claims. (Cl. 116—137)

This invention relates to signal whistles and more especially to a signal whistle which emits supersonic vibrations.

It is an object of the invention to provide a supersonic whistle the various sound producing elements of which are readily adjustable with respect to one another.

It is another object of this invention to provide a whistle which is readily adjustable as to pitch.

It is a further object of this invention to provide a whistle the various parts of which are readily formed by automatic machinery and which parts are readily assembled and disassembled.

Other objects and many of the attendant advantages of this invention will be readily appreciated as the same becomes better understood by reference to the following detailed description when considered in connection with the accompanying drawings wherein:

Fig. 1 is a longitudinal section of the whistle of this invention;

Fig. 2 is an elevation of the left end of the whistle shown in Fig. 1;

Fig. 3 is a section on the line III—III of Fig. 1; and

Fig. 4 is an elevation of the right end of the whistle shown in Fig. 1.

Referring to the drawings, the reference numeral 10 designates a supply tube. A spindle, or shaft, 12 comprises a fluted end portion 14 at its right hand end as viewed in Fig. 1 which fluted portion 14 is pressed into one end of the tube 10 for frictional retainment therein.

The spindle 12 also comprises an enlarged portion or languet 16 adjacent the fluted portion 14, a cylindrical portion 18 adjacent the languet 16, and a threaded end portion 20 adjacent the cylindrical portion 18. All portions 14, 16, 18, and 20 of the spindle 12 as well as all other elements of the whistle to be described subsequently are cylindrical and are positioned coaxially.

The supply tube 10 is provided with external threads 22 which engage internal threads 24 formed on a portion 26 of lower lip member, or outer tube, 28. Another portion 30 of the outer tube 28 overlies and extends beyond the languet 16 to form an annular passage 32 therewith. The portion 30 of the tube 28 is known as the lower lip of the whistle. The arrangement is such that if air under pressure is introduced into the supply tube 10, it will flow through the flutes of the portion 14 and then in an annular stream through the passage 32.

A hollow irregular cylindrical portion 34 comprises an internally threaded portion 36 which engages the thread of the threaded portion 20 of the spindle 12. A second portion 37 lying to the right of the threaded portion 36 is provided with an external thread 38, and an enlarged portion 39 lying to the right of the threaded portion 37 closely surrounds the cylinder 18 of the spindle 12.

Upper lip member 40 is a hollow cylinder which has an internally threaded portion 42 which engages the threads 38 of the threaded portion 37 of the piston 34. Member 40 has a second portion 44 which extends to the right as viewed in Fig. 1 and closely overlies and extends beyond the enlarged portion 39 of the piston 34. The edge 46 of the portion 44 is beveled and is known as the upper lip of the whistle.

The annular space surrounding the cylinder 18 and lying to the right of the hollow cylindrical portion 39 and within the portion 44 of the irregular cylinder 40 forms an acoustic cavity, or resonant chamber, which is also known as the resonator of the whistle. The upper lip 46 lies directly opposite the lower lip 30.

The whistle represents a complicated oscillatory structure. Its pitch is essentially determined by the depth of the resonator.

It will be apparent from the above that the parts of this whistle can be readily manufactured by automatic screw machinery, that the parts are readily assembled, and are readily adjustable with respect to one another to secure the best functioning of the whistle.

Obviously many modifications and variations of the present invention are possible in the light of the above teachings. It is therefore to be understood that within the scope of the appended claims the invention may be practiced otverwise than specifically described.

What is claimed is:

1. In a supersonic whistle having a cylindrical upper lip member, a cylindrical lower lip member spaced therefrom, and a cylindrical languet within said lower lip and forming with the lower lip member an annular passage, the improvements comprising, means forming with the upper lip member a toroidal acoustic cavity, said cavity being coaxial with said annular passage, the outer diameter of the acoustic cavity being substantially equal to the outer diameter of the annular passage, the inner diameter of the acoustic cavity being less than the inner diameter of the annular passage, means for varying the depth of the acoustic cavity, other means for varying the distance the lower lip member projects past the languet toward the upper lip member, and independent means for varying the spacing between the upper and lower lip members.

2. A supersonic whistle comprising a shaft having first and second end portions, a languet of greater diameter than, and adjacent the first end portion, a cylindrical part of lesser diameter than the languet and adjacent the second end portion, a hollow supply tube fitted on the first end portion, a hollow cylindrical lower lip member movably mounted on the supply tube, the inner walls of the lower lip member being spaced from the outer surface of the languet to form a narrow annular passage, means forming a passageway connecting the interior of the supply tube with the annular passage, a hollow piston movably mounted on the second end portion of the shaft, and a hollow cylindrical upper lip member movably mounted on the piston, the diameters of the inner walls of the upper and lower lip members being substantially equal, the inner wall of the upper lip member, one end of the piston, and the cylindrical part of the shaft forming an acoustic cavity, whereby the frequency of the acoustic energy produced is determined by the amount of the lower lip member extends past the languet, the depth of the acoustic cavity, and the distance between the upper and lower lip members.

3. A supersonic whistle comprising a shaft having an end portion and a threaded end portion, a languet of greater diameter than, and adjacent, said end portion, a cylindrical part of lesser diameter than said languet and adjacent the threaded end portion, a hollow cylindrical supply tube fitted on the end portion, a hollow cylindrical lower lip member threadably mounted on the supply tube to permit relative movement, the inner walls of the lower lip member being spaced from the outer surface of the languet to form a narrow annular passage, means forming a passage connecting the interior of the supply tube with said annular passage, a hollow piston threadably mounted on the threaded end portion of the shaft, for relative movement, a hollow cylindrical upper lip member threadably mounted on the piston for relative movement, the inner wall of the upper lip member, one end of the piston, and the cylindrical part of the shaft forming a resonant chamber, the diameter of the inner walls of the lip member being substantially equal, whereby the frequency of the acoustic energy produced is determined by the amount the lower lip member extends past the languet, the depth of the resonant chamber, and the space between the upper and lower lip members.

References Cited in the file of this patent

UNITED STATES PATENTS

| | | |
|---|---|---|
| 2,238,668 | Wellenstein | Apr. 15, 1941 |
| 2,245,484 | Leavens | June 10, 1941 |
| 2,519,619 | Yellott | Aug. 22, 1950 |
| 2,532,554 | Joeck | Dec. 5, 1950 |
| 2,571,640 | Williams | Oct. 16, 1951 |